US010289385B2

(12) United States Patent
Sukhwani et al.

(10) Patent No.: US 10,289,385 B2
(45) **Date of Patent: *May 14, 2019**

(54) HARDWARE IMPLEMENTATION OF A TOURNAMENT TREE SORT ALGORITHM USING AN EXTERNAL MEMORY

(71) Applicant: International Business Machines Corporation, Armonk, NY (US)

(72) Inventors: Bharat Sukhwani, Briarcliff Manor, NY (US); Mathew S. Thoennes, Port Chester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 548 days.

This patent is subject to a terminal disclaimer.

(21) Appl. No.: 14/741,490

(22) Filed: Jun. 17, 2015

(65) Prior Publication Data

US 2016/0188644 A1 Jun. 30, 2016

Related U.S. Application Data

(63) Continuation of application No. 14/583,999, filed on Dec. 29, 2014.

(51) Int. Cl.
*G06F 17/30* (2006.01)
*G06F 7/24* (2006.01)

(52) U.S. Cl.
CPC .......... *G06F 7/24* (2013.01); *G06F 17/30495* (2013.01)

(58) Field of Classification Search
None
See application file for complete search history.

(56) References Cited

U.S. PATENT DOCUMENTS 6,282,541 B1 * 8/2001 Hoa .................. G06F 17/30489
2014/0330801 A1 * 11/2014 Kaldewey ........... G06F 17/3033 707/698

OTHER PUBLICATIONS

U.S. Appl. No. 14/977,832, filed Dec. 22, 2015; "Tunable Hardware Sort Engine for Performing Composite Sorting Algorithms".
(Continued)

*Primary Examiner* — Wilson Lee
(74) *Attorney, Agent, or Firm* — Cantor Colburn LLP; Rabin Bhattacharya

(57) ABSTRACT

Embodiments include methods, systems and computer program products for performing a tournament tree sort on a hardware accelerator having an external memory. The method includes receiving a plurality of key values by the hardware accelerator, assigning each of the plurality of key values a sequential key number as the plurality of key values are received and performing pairwise comparisons of each of the plurality of key values to identify a winning key and a losing key. The method also includes storing the losing key of each pairwise comparison in a first section of the external memory, wherein a location in the first section is based on the key number of the losing key and storing the winning key of each pairwise comparison in a second section of the external memory, wherein a location in the second section is based on the key number of the winning key.

5 Claims, 8 Drawing Sheets

(56) References Cited

OTHER PUBLICATIONS

U.S. Appl. No. 14/977,835, filed Dec. 22, 2015; "Tunable Hardware Sort Engine for Performing Composite Sorting Algorithms".
List of IBM Patents or Patent Applictions Treated as Related; (Appendix P), Date Filed Mar. 25, 2016, 2 pages.
U.S. Appl. No. 13/961,089, filed Aug. 7, 2013.
U.S. Appl. No. 13/961,092, filed Sep. 7, 2013.
U.S. Appl. No. 14/018,646, filed Sep. 5, 2013.
U.S. Appl. No. 14/018,647, filed Sep. 5, 2013.
U.S. Appl. No. 12/246,751, filed Oct. 7, 2008.
U.S. Appl. No. 13/961,094, filed Aug. 7, 2013.
U.S. Appl. No. 13/961,095, filed Aug. 7, 2014.
U.S. Appl. No. 14/018,650, filed Sep. 5, 2013.
U.S. Appl. No. 14/018,651, filed Sep. 5, 2013.
U.S. Appl. No. 14/328,933, filed Jul. 11, 2014.
U.S. Appl. No. 14/583,999, filed Dec. 29, 2014.
List of IBM Patents or Patent Applications Treated as Related—Date Filed: Sep. 17, 2015; 2 pages.

* cited by examiner

HARDWARE IMPLEMENTATION OF A TOURNAMENT TREE SORT ALGORITHM USING AN EXTERNAL MEMORY

DOMESTIC PRIORITY

This application is a continuation application of the legally related U.S. Ser. No. 14/583,999 filed Dec. 29, 2014, the contents of which are incorporated by reference herein in their entirety.

STATEMENT REGARDING PRIOR DISCLOSURES BY THE INVENTOR OR A JOINT INVENTOR

Grace Period Disclosure in accordance with 37 C.F.R. 1.77(b)(6): Bharat Sukhwani; Mathew Thoennes; Hong Min; Parijat Dube; Bernard Brezzo; Sameh Asaad and Donna Dillenberger "A Hardware/Software Approach for Database Query Acceleration with FPGAs", Int. J. Parallel Prog., Published online: 28 Oct. 2014; Springer; pp. 1-31.

BACKGROUND

The present invention relates to hardware implementations of sorting algorithms, and more specifically, to an efficient hardware implementation of a tournament tree sort algorithm using a hardware device having an external memory.

Sorting is generally acknowledged to be one of the most time-consuming computer-implemented procedures. It has been estimated that over twenty-five percent of all computer running time is devoted to sorting. In fact, many computing systems use over half of their available computer time for sorting. Numerous proposals and improvements have been disclosed in the art for the purposes of reducing sorting time and increasing sorting efficiency. There are a variety of sorting algorithms that are currently being used, one of which is called a tournament tree sort.

In general, a tournament tree sort is a binary-tree based selection and replacement sort algorithm. Tournament tree sort algorithms allow sorting of keys in a continuous streaming fashion. Incoming keys are entered into the leaf nodes and the keys exit, in sorted order, from the tree's root node. For a set of input records that are initially populated into the leaf nodes, pair-wise comparisons are performed at each tree level until a winning record emerges at the tree root. After the initial round of comparison and population, each non-leaf node holds exactly one input key, except the winning key which is sent out of the tree. During a continuous sort, after a winner is removed from the tree, a new input record is inserted at the previous winner's leaf node and is compared (and swapped, if needed) with exactly one non-leaf node at each level, until the tree root is reached and the new winner is determined.

SUMMARY

According to an embodiment, a method for performing a tournament tree sort on a hardware accelerator includes assigning each of the plurality of key values a sequential key number as the plurality of key values are received and performing pairwise comparisons of each of the plurality of key values to identify a winning key and a losing key. The method also includes storing the losing key of each pairwise comparison in a first section of the external memory, wherein a location in the first section is based on the key number of the losing key and storing the winning key of each pairwise comparison in a second section of the external memory, wherein a location in the second section is based on the key number of the winning key.

According to another embodiment, a hardware accelerator for performing a tournament tree sort having an external memory configured to store each of a plurality of key values and a processor. The processor is configured to receive a plurality of key values by the hardware accelerator, assign each of the plurality of key values a sequential key number as the plurality of key values are received, and perform pairwise comparisons of each of the plurality of key values to identify a winning key and a losing key. The processor is also configured to store the losing key of each pairwise comparison in a first section of the external memory, wherein a location in the first section is based on the key number of the losing key and store the winning key of each pairwise comparison in a second section of the external memory, wherein a location in the second section is based on the key number of the winning key.

According to another embodiment, a computer program product including a non-transitory computer readable storage medium having computer readable program code stored thereon that, when executed, performs a method. The method includes assigning each of the plurality of key values a sequential key number as the plurality of key values are received and performing pairwise comparisons of each of the plurality of key values to identify a winning key and a losing key. The method also includes storing the losing key of each pairwise comparison in a first section of the external memory, wherein a location in the first section is based on the key number of the losing key and storing the winning key of each pairwise comparison in a second section of the external memory, wherein a location in the second section is based on the key number of the winning key.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Current techniques for performing a tournament tree sort algorithm by a hardware device utilize storage built into the hardware device to store the key values of the nodes to be sorted and manipulates the storage of pointers to the stored nodes to perform sorting. One such implementation is described in detail in U.S. patent application Ser. No. 13/961,092 filed on Aug. 7, 2013 entitled HARDWARE IMPLEMENTATION OF A TOURNAMENT TREE SORT ALGORITHM, the entirety of which is hereby incorporated by reference.

In these implementations, the amount of storage on the hardware device, or accelerator, effectively limits the number of keys that can be stored and sorted by the tournament tree sort algorithm. In many cases, it may be desirable to sort a larger number of keys than the accelerator can store. Accordingly, what is needed is a tournament tree sort algorithm implemented using a hardware device, such as an accelerator, and an external memory in communication with the hardware device.

Embodiments disclosed herein include a tournament tree sort algorithm implemented using a hardware device, such as an accelerator, and an external memory in communication with the hardware device. In exemplary embodiments, the external memory is used to efficiently store the nodes of the tournament tree and the accelerator is configured to perform the comparisons of the nodes during sorting.

Figure 1:
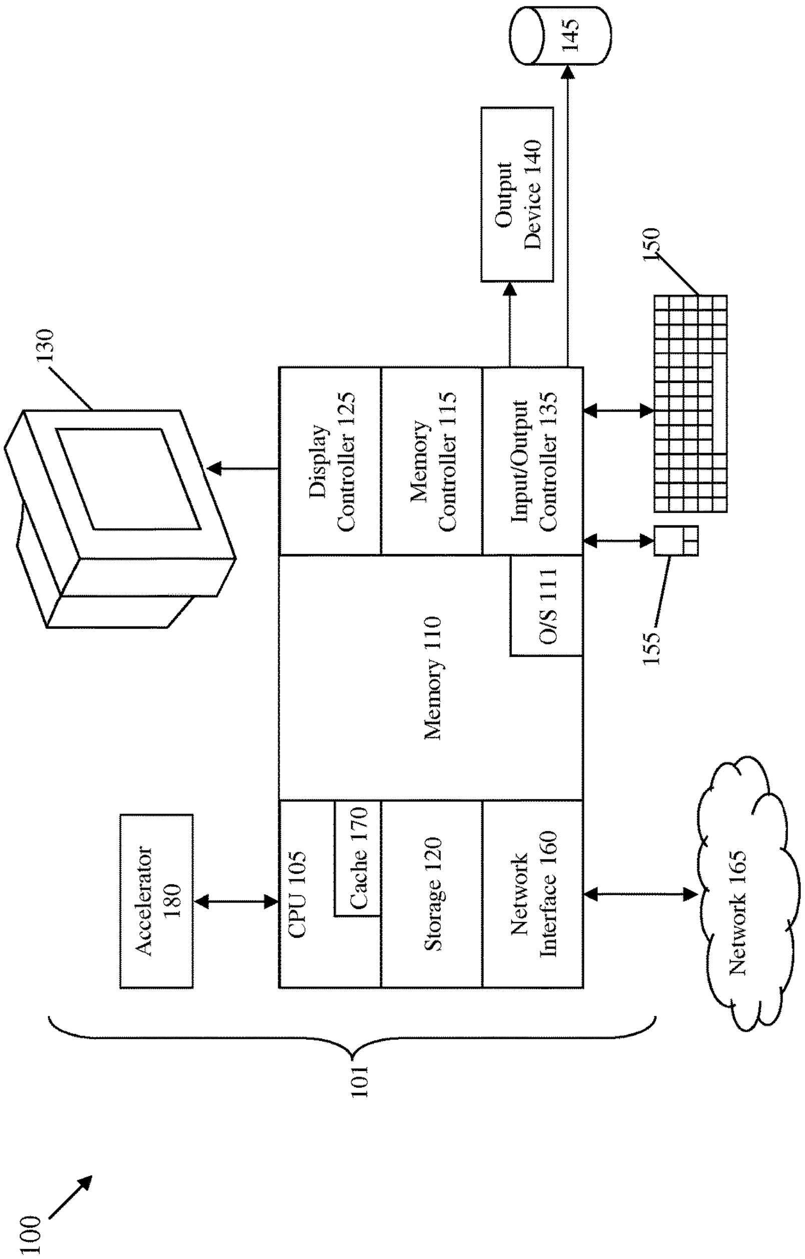
FIG. 1 is a block diagram of a computer system for practicing the teachings herein according to an exemplary embodiment.

Referring now to FIG. 1, a block diagram of an exemplary computer system 100 for use with the teachings herein is shown. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 1, the computer 101 includes a central processing unit (CPU) 105, memory 110 coupled via a memory controller 115, a storage device 120, and one or more input and/or output (I/O) devices 140, 145 (or peripherals) that are communicatively coupled via a local input/output controller 135. The input/output controller 135 can be, for example, but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The storage device 120 may include one or more hard disk drives (HDDs), solid state drives (SSDs), or any other suitable form of storage.

The CPU 105 is a computing device for executing hardware instructions or software, particularly that stored in memory 110. The CPU 105 can be any custom made or commercially available processor, a central processing unit, an auxiliary processor among several processors associated with the computer 101, a semiconductor based microprocessor (in the form of a microchip or chip set), a macroprocessor, or generally any device for executing instructions. The CPU 105 may include a cache 170, which may be organized as a hierarchy of more cache levels (L1, L2, etc.).

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the CPU 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as Wi-Fi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the storage devices. The BIOS is stored in ROM so that the BIOS can be executed when the computer 101 is activated.

When the computer 101 is in operation, the CPU 105 is configured to execute instructions stored within the memory 110, to communicate data to and from the memory 110, and to generally control operations of the computer 101 pursuant to the instructions. In exemplary embodiments, the computer system 100 includes one or more hardware accelerators 180 that are configured to communicate with the CPU 105.

Figure 2:
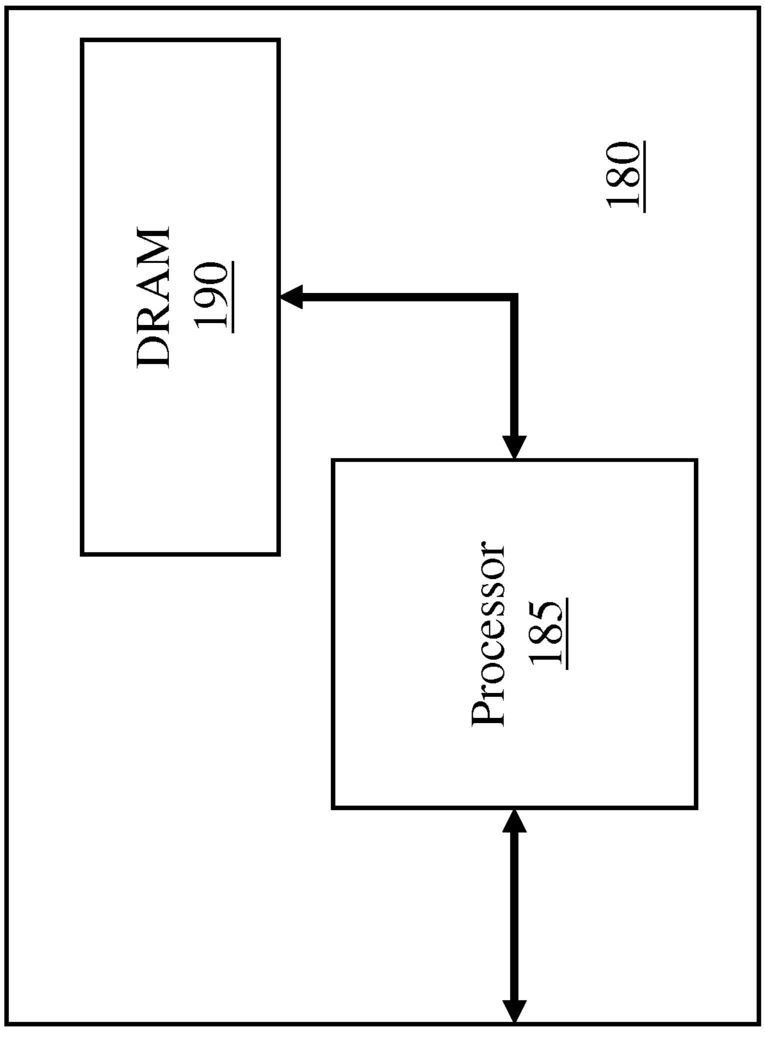
FIG. 2 is a block diagram of a hardware accelerator having an external memory in accordance with an exemplary embodiment.

Referring now to FIG. 2, a block diagram of a hardware accelerator 180 that includes an external memory 190 and a processor 185 in accordance with an exemplary embodiment is shown. In exemplary embodiments, the processor 185 and the external memory 190 are configured to communicate directly via a dedicated communication bus. The external memory 190 can include any one or combination of volatile memory elements (e.g., random access memory (RAM, such as DRAM, SRAM, SDRAM, etc.)) and nonvolatile memory elements (e.g., ROM, erasable programmable read only memory (EPROM). In exemplary embodiments, the processor 185 may be a field programmable gate array (FPGA), an application-specific integrated circuit (ASIC), or other suitable device that is configured to perform specific processing tasks. In exemplary embodiments, the computer system 100 may be configured to offload certain processing tasks to a hardware accelerator 180 because the processor 185 can perform the processing tasks more efficiently than the CPU 105. In exemplary embodiments, the size of the external memory 190 may be selected based on the number and size of the keys that will be sorted by the hardware accelerator 180.

Although not shown in FIG. 2, it will be understood by those of ordinary skill in the art that the processor 185 will include some built in memory. Hardware accelerators that do not include an external memory have on the order of a few MB of embedded memory. Accordingly, for example, for key values that are about forty Bytes in size, the embedded memory can store at most 125,000 keys. In contrast, a two gigabyte (GB) external memory can easily store in excess of 32 million keys.

A tournament tree algorithm allows continuous sorting of streaming input keys. Tournament trees with N leaf nodes guarantees a minimum sorted run of size N, although much larger sorted runs can usually be achieved, with typical run sizes being 2N. For example, in the case of data that is almost sorted, which happens frequently in relational databases, a tournament tree can continuously sort the inputs. For each new key inserted into the tree, the tournament tree algorithm requires only one comparison at each of the log(N) levels of the tree, since the comparisons are made along a known path to the root.

Figure 3A:
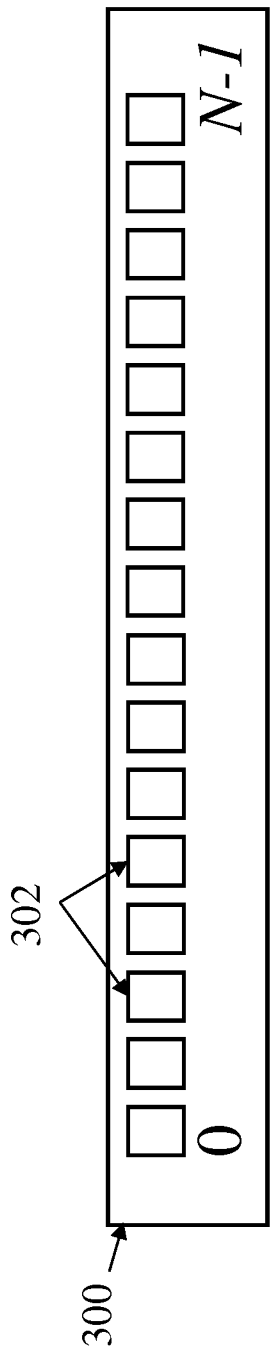
FIG. 3A is a block diagram of an array of N keys to be sorted by a sorting algorithm in accordance with an exemplary embodiment.

Referring now to FIG. 3A, a block diagram of an array 300 of N keys 302 to be sorted by a sorting algorithm is shown. In exemplary embodiments, as each key 302 is received it is assigned a key number that is associated with a location in the array 300. During the population of the tournament tree, key numbers are assigned to each key serially until N is reached. Once the tournament tree is fully populated, each incoming key is assigned the key number of the last key emitted from the tournament tree. It will be understood by those of ordinary skill in the art that the array 300 is only shown for discussion purposes and that the keys 302 are not stored in the array 300

Figure 3B:
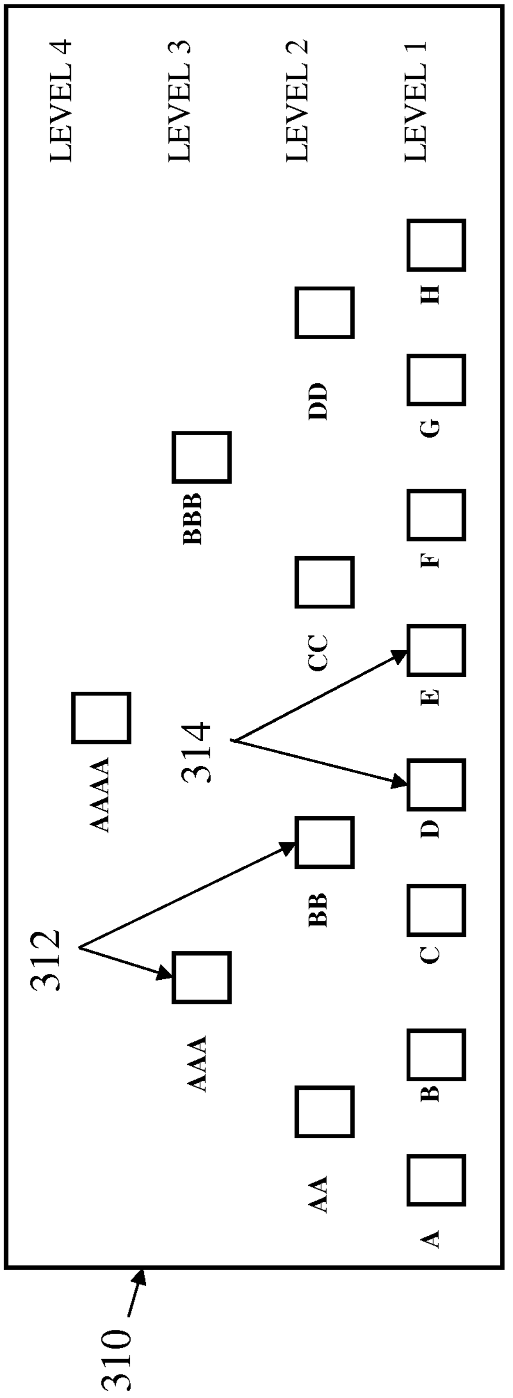
FIG. 3B is a block diagram of a tournament tree having leaf nodes that correspond to the keys of the array of FIG. 3A that have been sorted by a sorting algorithm in accordance with an exemplary embodiment.

Referring now to FIG. 3B, a block diagram of a tournament tree 310 having a plurality of nodes 312, 314 is shown. Each of the nodes is used to store one of the keys 302 of the array 300 shown in FIG. 3A. As will be understood by those of ordinary skill in the art, the tournament tree and array illustrated are merely exemplary and the number of keys/nodes used in the tournament tree and array may be much larger. For example, one implementation of the tournament tree may include approximately 16,000 leaf nodes. In exemplary embodiments, the nodes 312 nodes of the tree at a particular level store the losers of pairwise comparisons performed at that level, while the winners move up the tree for further comparison at the next level For example, in level 1 of the tournament tree 310 node A will be used to store the loser of the comparison between Key 0 and Key 1. Likewise in level 2 of the tournament tree 310 node AA will be used to store the loser of the comparison between the winning key of the keys compared for node A and the winning key of the keys compared for node B. In exemplary embodiments, the tournament tree 310 will include N/2 leaf nodes 314 and (N/2)−1 non-leaf nodes 312, for a total of N−1 nodes.

In exemplary embodiments, by assigning a key number to each key in the tournament tree 310, the path through the tournament tree 310 is known given the leaf number of the key. For example, the key assigned key number 10 will necessarily traverse nodes F CC BBB AAAA for evaluation. In exemplary embodiments, if the keys numbers are assigned sequentially using binary numbers, the leading bits of the key number can be used to index the key at each level of the tournament tree 310. For example, key numbers 0 and 1, which will be compared during the first level comparison, share a common prefix 000. Likewise, key numbers 0, 1, 2 and 3, which will be compared during the second level comparison, share a common prefix 00.

| Key Number | LVL1 | LVL2 | LVL3 |
|---|---|---|---|
| 0 | 0000 | 0000 | 0000 |
| 1 | 0001 | 0001 | 0001 |
| 2 | 0010 | 0010 | 0010 |
| 3 | 0011 | 0011 | 0011 |
| 4 | 0100 | 0100 | 0100 |
| 5 | 0101 | 0101 | 0101 |
| 6 | 0110 | 0110 | 0110 |
| 7 | 0111 | 0111 | 0111 |
| 8 | 1000 | 1000 | 1000 |
| 9 | 1001 | 1001 | 1001 |
| 10 | 1010 | 1010 | 1010 |
| 11 | 1011 | 1011 | 1011 |
| 12 | 1100 | 1100 | 1100 |
| 13 | 1101 | 1101 | 1101 |
| 14 | 1101 | 1101 | 1101 |
| 15 | 1111 | 1111 | 1111 |

In exemplary embodiments, accessing the keys stored on the external memory to load into the accelerator for comparisons incurs some delay, or latency. Accordingly, an efficient storage structure for storing the keys in the external memory is provided to minimize the number of external memory accesses needed to retrieve keys. In addition, by storing the keys in known locations, when a new key is received, only one key from each level needs to be retrieved to evaluate the key for insertion into the tournament tree 310.

In exemplary embodiments, the keys are evaluated sequentially from Level 1 through higher levels in the tournament tree. Accordingly, the keys needed for evaluating against a newly inserted key can be fetched from external memory sequentially in the path through the tree associated with the last winning key number, as shown in the table below:

TABLE 1

| PATH THROUGH TREE | | | | |
|---|---|---|---|---|
| Key Number | LVL1 | LVL2 | LVL3 | LVL4 |
| 0, 1 | A (0) | AA (0) | AAA (0) | AAAA |
| 2, 3 | B (1) | AA (0) | AAA (0) | AAAA |
| 4, 5 | C (2) | BB (1) | AAA (0) | AAAA |
| 6, 7 | D (3) | BB (1) | AAA (0) | AAAA |
| 8, 9 | E (4) | CC (2) | BBB (1) | AAAA |
| 10, 11 | F (5) | CC (2) | BBB (1) | AAAA |
| 12, 13 | G (6) | DD (3) | BBB (1) | AAAA |
| 14, 15 | H (7) | DD (3) | BBB (1) | AAAA |

In exemplary embodiments, log(n) comparisons per key will be made upon the insertion of a new key into the tournament tree 310. The address of all the keys required for comparison for this new key can be determined as soon as the new key enters the tree. In exemplary embodiments, the processor can immediately request one or more of the needed keys from the external memory as soon as the previous winning key is emitted from the tournament tree. The number of keys requested at one time from the external memory may be based on the amount of memory available in the processor and the size of the keys.

Figure 3C:
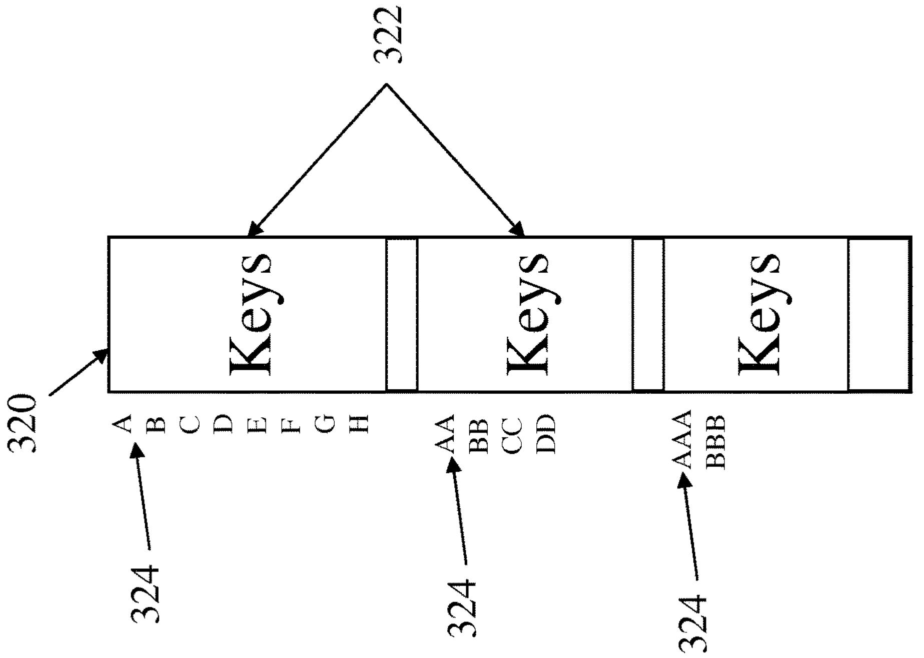
FIG. 3C is a block diagram of an external memory structure for storing the sorted leaf nodes of the tree of FIG. 3B in accordance with an exemplary embodiment.

Referring now to FIG. 3C, a block diagram of an external memory 320 for storing the sorted keys corresponding to the leaf nodes 312 of the tournament tree of FIG. 3B is shown. As illustrated, the external memory 320 is divided into multiple sections 322 that are designed to each correlate to one of the levels of the tournament tree 310. In each section 322 of the external memory 320 a plurality of keys 324 are stored. In exemplary embodiments, the sections 322 of the external memory 320 may be sized such that the address of each of the keys can be easily determined. In addition, the keys 324 may be stored in the sections of the external memory such that the address of each of the keys can be easily determined. In other words, based on the size of the tournament tree and the keys, the keys 324 may not be stored back to back, there may be some unused space in the external memory between each of the keys 324. Likewise, the sections 322 may be sized such that there is some free space left between the last key 324 in a section 322 and the end of the section. In exemplary embodiments, each of the keys may be allocated a 64 B space in the external memory which would allow a 2 GB external memory to store approximately 80 million keys. In another embodiment, each of the keys may be allocated a 256 B space in the external memory.

Figure 4:
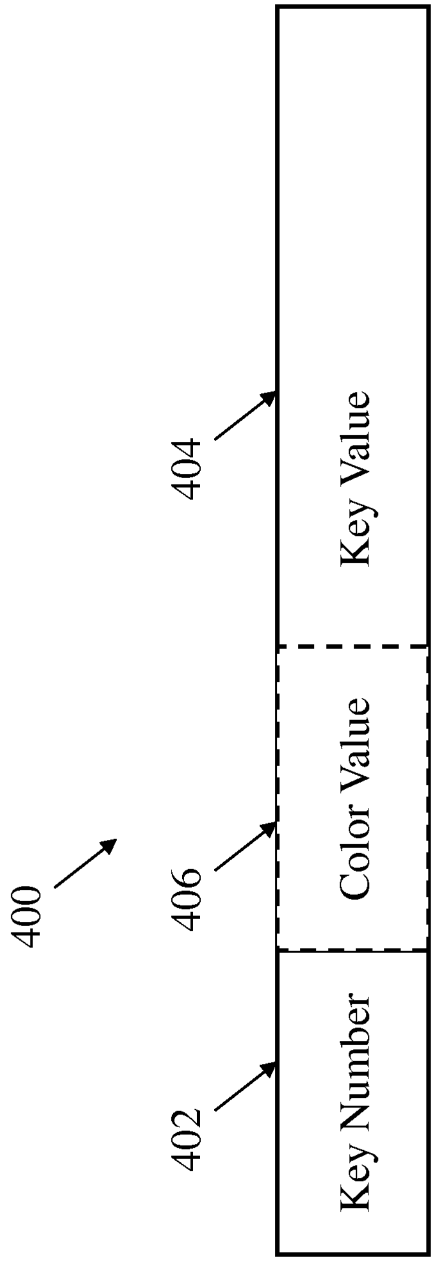
FIG. 4 is a block diagram of a key structure used for storing a key in an external memory in accordance with an exemplary embodiment.

Referring now to FIG. 4, a block diagram of a key 400 that will be stored in the external memory is shown. As illustrated the key 400 includes a key number 402 that is assigned to the key as it is received by the accelerator and a key value 404. In some embodiments, the key 400 may also have a color value 406 that is assigned to the key as it is received by the accelerator. In exemplary embodiments, the color value 406 indicates the generation of the tournament tree sort run and allows the key 400 to participate in the tournament tree without corrupting the current sorted run. In one embodiment, the color value 406 may be a three bit value that is inserted in the front of a key value 404. In exemplary embodiments, a three bit color value 406 can be used to identify seven separate tournament tree sort runs. In exemplary embodiments, the lowest, or highest if ascending, color value 406 may be reserved to act as a dummy key to flush the tree at the end of all the runs.

In exemplary embodiments, the use of the color, or run generation indicator, eliminates the need to flush the tournament tree between sorted runs, which provides significant time savings. For example, flushing a sixteen thousand node tree would otherwise require inserting sixteen thousand extra dummy keys, potentially doubling the sorting time for each run. With the coloring scheme, flushing is required only once after all the sorted runs have been generated and there are no more keys to be sorted.

Figure 5:
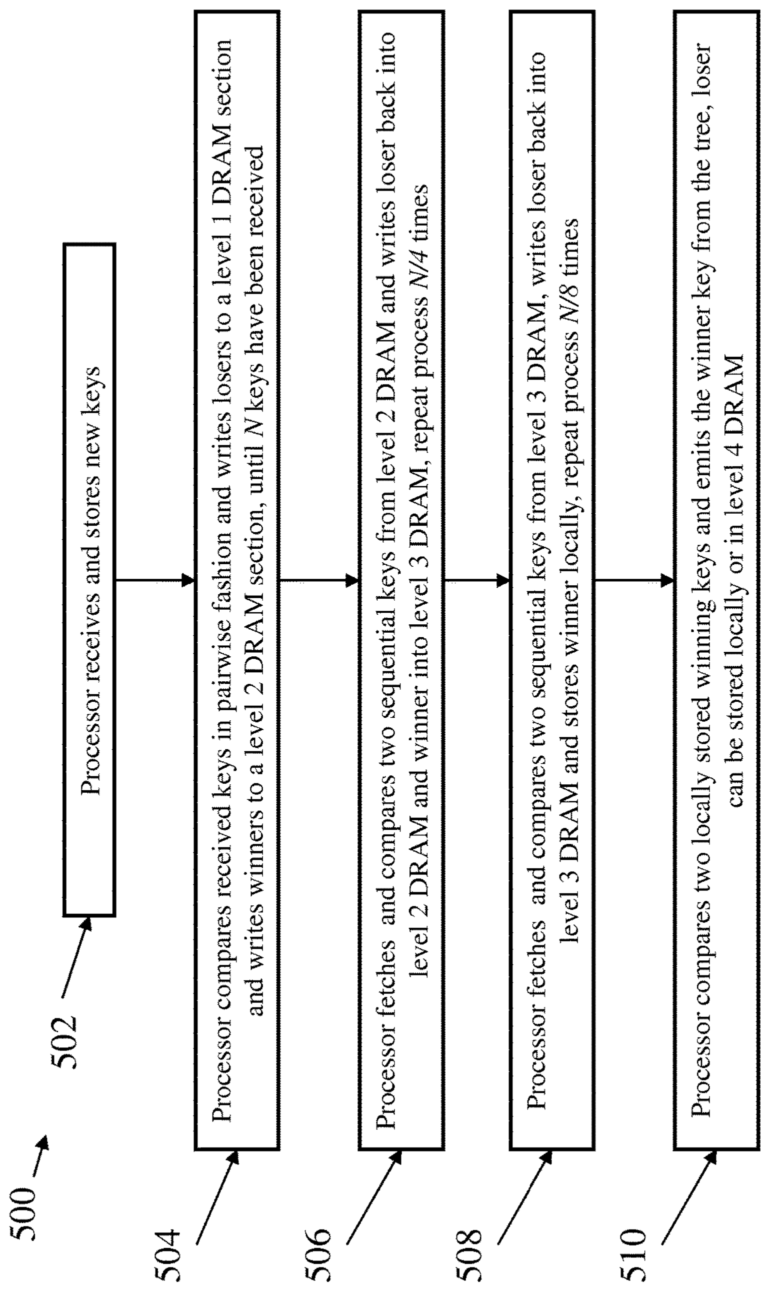
FIG. 5 is a flow diagram of a method for populating a tournament tree and storing keys in an external memory in accordance with an exemplary embodiment.
Figure 6:
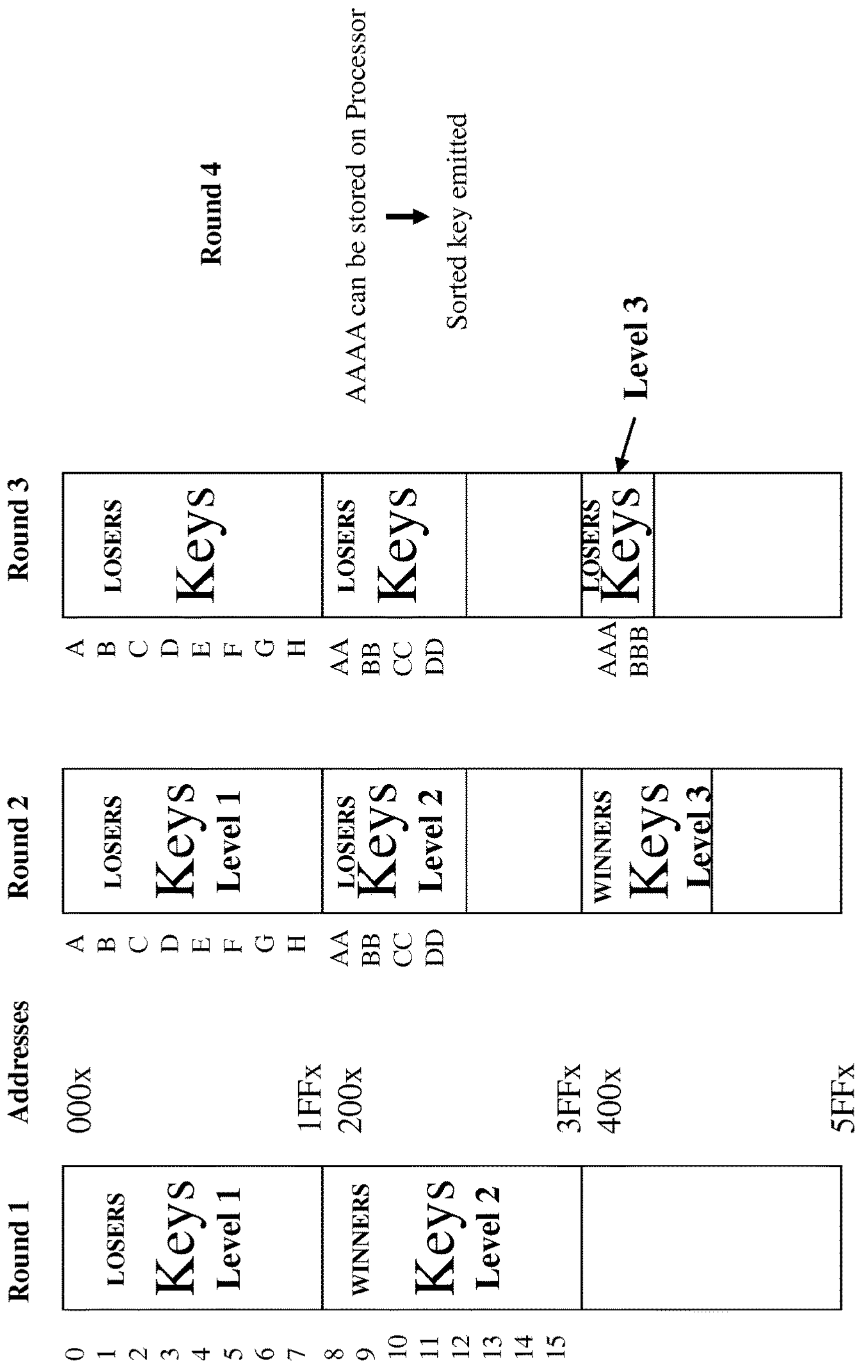
FIG. 6 is a block diagram of an external memory illustrating the storage of sorted keys in accordance with an exemplary embodiment.

Referring now to FIG. 5, a flow diagram of a method 500 for populating a tournament tree and storing keys in an external memory in accordance with an exemplary embodiment is shown. As illustrated at block 502, the method 500 includes a processor receiving and locally storing keys. As the new keys are received the processor sequentially assigns key number to the keys. Next, as shown at block 504, the method 500 includes the processor comparing the received keys in pairwise fashion and writing the losing keys to a first external memory section and writing the wining keys to a second external memory section, until N keys have been received. In exemplary embodiments, for more efficient writes to external memory, writing of multiples keys from the same level can be batched together as opposed to writing one key at a time. FIG. 6 is a block diagram of an external memory illustrating the state of the external memory storage of sorted keys during the method 500 shown in FIG. 5. The method 500 then includes the processor fetching and comparing two sequential keys from the second external memory section and writing the loser back into the second external memory section and the winner into a third external memory section, as shown at block 506; this step is repeated N/4 times.

Next, as shown at decision block 508, the method 500 includes the processor fetching and comparing two sequential keys from the third external memory section, writing the losing key back into the third external memory section and storing the winner locally; this step is repeated N/8 times. In embodiments with larger tournament trees, the winner may be written to a fourth external memory section instead of being stored locally by the processor. In exemplary embodiments, the top few levels of the tournament tree can be stored in the on-chip memory for efficient lookup of frequently-accessed keys. Next, as shown at block 510, the method 500 includes the processor comparing two locally stored winning keys and emitting the winner key from the tournament tree. In exemplary embodiments, the losing key can be stored locally by the processor or in the fourth external memory section. As will be appreciated by those of ordinary skill in the art, for larger tournament trees the method 500 will include more steps similar to those shown in blocks 506 and 508.

In exemplary embodiments, the direction of the tournament tree sorting algorithm can be varied, that is, the tournament tree sorting algorithm can be used to perform sorting in ascending or descending way. For example, in one embodiment, the winning key of a pairwise comparison is the key with the higher key value. In another embodiment, the winning key corresponds to the key with the lower key value.

Figure 7:
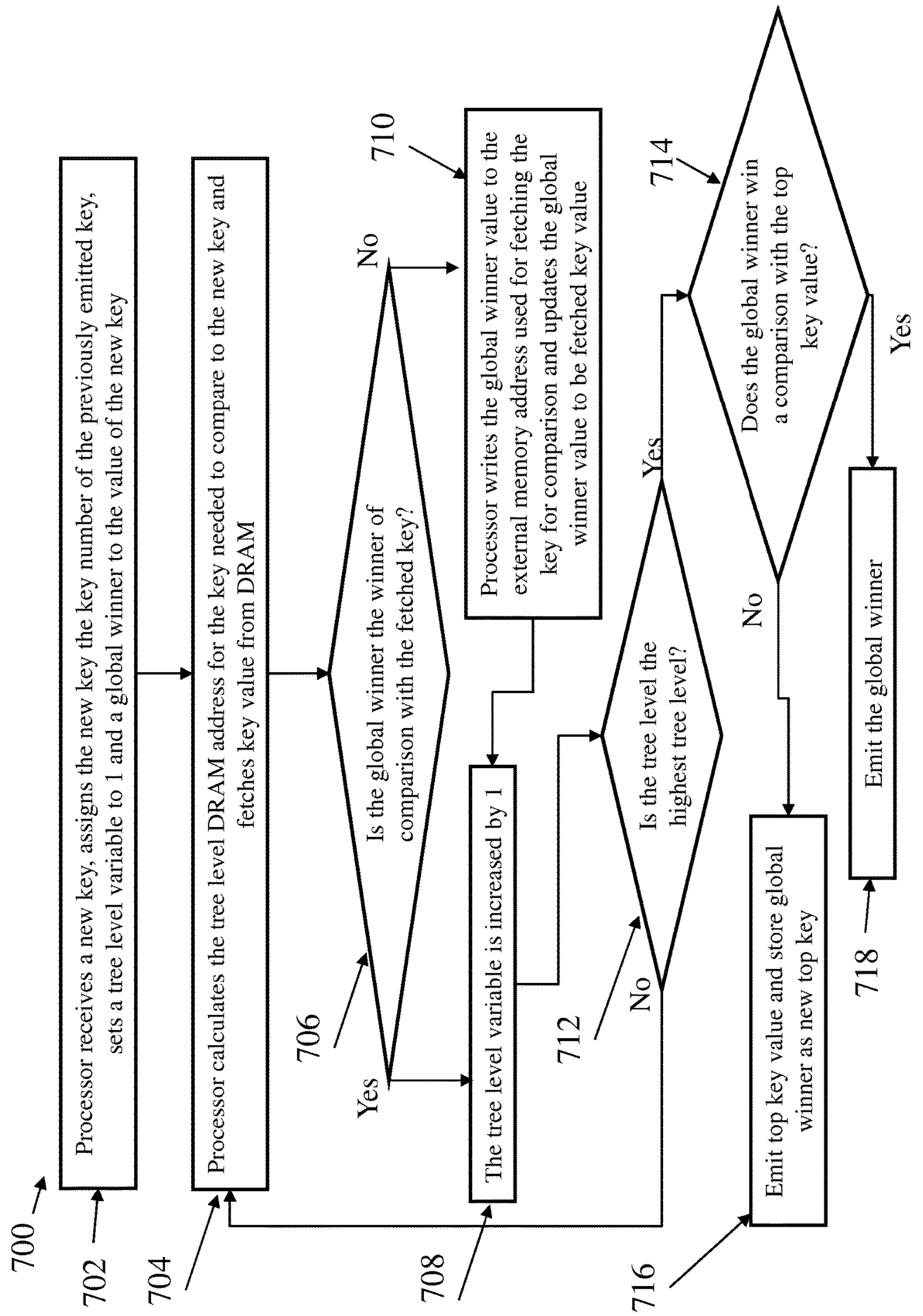
FIG. 7 is a flow diagram of a method for adding a new key to a populated tournament tree having its keys stored in an external memory in accordance with an exemplary embodiment.

Referring now to FIG. 7, a flow diagram of a method 700 for adding a new key to a populated tournament tree having its keys stored in an external memory in accordance with an exemplary embodiment is shown. As illustrated at block 702, the method 700 includes a processor receiving a new key, assigning the key number of the previously emitted key as the key number of the new key, and setting a tree level variable to 1 and a global winner value to the value of the new key. Next, as shown at block 704, the method 700 includes the processor calculating the tree level external memory address for the key needed to compare to the new key and fetching the key value from the external memory. For example, if the new key is assigned key number 1, the first key value needed for comparison will be the key value with the key number of 0 and the next key number needed will be the key stored in node A. As illustrated at decision block 706, the method 700 includes determining if the global winner value is the winner of comparison with the fetched key value. If the global winner value is the winner of comparison with the fetched key value, the method 700 proceeds to block 708, otherwise the method 700 proceeds to block 710.

As shown at block 708, the method 700 includes increasing the tree level variable by one. As illustrated at block 710, the method 700 includes the processor writing the global winner value to the external memory address used for fetching the key for comparison and updating the global winner value to be fetched key value. Next, as shown at decision block 712, the method 700 includes determining if the tree level is the highest tree level. If the tree level is the highest tree level, the method 700 proceeds to decision block 714, otherwise the method 700 returns to block 704. As illustrated at decision block 714, the method 700 includes determining if the global winner value is the winner of a comparison with the top key value. If the global winner value is the winner of a comparison with the top key value, the method 700 proceeds to block 718 and emits the global winner value. Otherwise the method 700 proceeds to block 716 and emits the top key value and stores the global winner value as new top key.

In exemplary embodiments, the latency of memory access to the external memory by the processor may be masked by having a two tree implementation. For example, the external memory could be used to store two separate trees which are each populated sequentially. In one embodiment, new keys are assigned a key number of a previously emitted key and the processor fetches all of nodes from external memory along tree path to evaluate that key. For i=0 to log(n) the processor would evaluate key at this level of tree with new key and swap keys if new key value loses the comparison with the stored key value in tree and emit the new sorted key. The processor would then write nodes from tree path back to external memory since there may have been a swap. In such an implementation, one tree can be evaluating while the other is writing out nodes from previous evaluation then reading in nodes for next evaluation. There will be a final merge of the output of the two trees to create a single sorted stream.

In exemplary embodiments, the latency of memory access to the external memory by the processor may be masked by using posted writes and overlapping the writing of nodes from the last evaluation with the reading of nodes for the next evaluation. For example, as soon as the node for a level from the last evaluation is written the nodes for that level of the tree are consistent and the node for the next evaluation for that level can be read.

In embodiments that utilize very large keys values, the processor may be configured to evaluate the key values in sections, which could be fetched serially left to right from the external memory. Such implementations would allow smaller comparator and could mask the latency of memory access with evaluation of current portion of key. In addition, the comparison could implement a short-circuit mechanism that would terminate the comparison of the sections of the key as soon as a difference is found.

In exemplary embodiments, for a given hardware design with a tournament tree of size N, the size of tournament tree being exercised may be configurable at run-time up to a maximum N. By allowing the size of the tree to be configurable the user can select a desired sort size and not incur the additional latency of using a tournament tree larger than needed. In such cases, the sizes would be restricted to powers of 2. In exemplary embodiments, if a user selects a desired sort size that is smaller than the maximum N, a subtree of the tournament tree is used to store and evaluate the nodes. The subtree can be the top of the tournament tree or any portion of the tournament tree. Depending on the implementation of the subtree, the mapping of key numbers to the memory address of the stored key values will be different. Given a tree size, the size of the keys and the size of the desired subtree, address generation logic can automatically generate such mapping.

In exemplary embodiments, both the number of keys and the size of the keys can be varied in the tournament tree sort algorithm. In exemplary embodiments, keys having a null key value may be inserted in the place of new input keys to flush the tree if no more keys remain to be sorted.

In exemplary embodiment, the processor of the hardware accelerator has an embedded memory or cache that can be used to store one or more upper levels of the tournament tree. Since the top levels of the tree will likely be accessed more frequently than the lower levels, the hardware accelerator can be configured to store upper levels of the tournament tree in an embedded memory to reduce the delay associated with reading and writing from the external memory. In addition, the embedded memory of the hardware accelerator can be used to cache the most frequently accessed or recently accessed key values from the external memory. In exemplary embodiments, the cache may be a write-through cache and thus no action is required when keys are discarded from the cache to clear space to store other keys. The size and configuration of the cache are implementation specific and may be dependent on the size of the embedded memory of the hardware accelerator.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of performing a tournament tree sort on a hardware accelerator having an external memory, comprising:

receiving a plurality of key values by the hardware accelerator;

assigning each of the plurality of key values a respective sequential key number as the plurality of key values are received, wherein each respective sequential key number is unique;

performing a respective pairwise comparison of each pairing of key values assigned consecutive sequential key numbers as each pairing of key values is received to identify a respective winning key and a respective losing key for each respective pairwise comparison;

storing the respective losing key of each respective pairwise comparison in a first section of an external memory disposed on the hardware accelerator, wherein the respective losing key is stored at a physical location in the first section that is based on the respective sequential key number assigned to the respective losing key;

storing the respective winning key of each respective pairwise comparison in a second section of the external memory, wherein the respective winning key is stored at a physical location in the second section that is based on the respective sequential key number assigned to the respective winning key;

performing subsequent pairwise comparisons of the winning keys and store a respective winning key of each subsequent pairwise comparison in a third section of the external memory, wherein the respective winning key of each subsequent pairwise comparison is stored at a physical location in the third section is based on the respective sequential key number assigned to the respective winning key of each subsequent pairwise comparison;

receiving a new key;

reducing a number of accesses of the external memory by retrieving, from the external memory, only one key from each level of a tournament tree to reduce a total latency associated with accessing the external memory, wherein each retrieved key is a losing key stored in the first section of the external memory or a winning key stored in the second section of the external memory; and evaluating the new key for insertion into the tournament tree based on each retrieved key, wherein the first section of the external memory, the second section of the external memory, and the third section of the external memory correspond to different levels of the tournament tree, respectively, and wherein the processor of the hardware accelerator is one of a field programmable gate array or an application-specific integrated circuit.

2. The method of claim 1, wherein the hardware accelerator includes an embedded memory configured to store one or more key values that are not stored in the external memory.

3. The method of claim 1, further comprising emitting a particular winning key.

4. The method of claim 3, further comprising:

setting a key number of the new key to the key number of the particular winning key previously emitted.

5. The method of claim 4, wherein the location of each key retrieved from the external memory is based on the key number of the new key.

* * * * *